(12) United States Patent
Robert et al.

(10) Patent No.: US 9,146,252 B2
(45) Date of Patent: Sep. 29, 2015

(54) IN-PLANE PIEZORESISTIVE DETECTION SENSOR

(75) Inventors: Philippe Robert, Grenoble (FR); Sébastien Hentz, Varces (FR)

(73) Assignee: Comissariat a l'energie atomique et aux energies alternatives, Paris (FR)

( * ) Notice: Subject to any disclaimer, the term of this patent is extended or adjusted under 35 U.S.C. 154(b) by 410 days.

(21) Appl. No.: 13/503,146

(22) PCT Filed: Oct. 20, 2010

(86) PCT No.: PCT/EP2010/065780
§ 371 (c)(1),
(2), (4) Date: Apr. 20, 2012

(87) PCT Pub. No.: WO2011/048132
PCT Pub. Date: Apr. 28, 2011

(65) Prior Publication Data
US 2012/0210792 A1 Aug. 23, 2012

(30) Foreign Application Priority Data
Oct. 23, 2009 (FR) ..................... 09 57462

(51) Int. Cl.
*G01P 15/10* (2006.01)
*G01P 15/08* (2006.01)
*G01P 15/12* (2006.01)

(52) U.S. Cl.
CPC ........... *G01P 15/0802* (2013.01); *G01P 15/123* (2013.01); *G01P 2015/0817* (2013.01)

(58) Field of Classification Search
CPC ........ H01L 41/22; H01L 41/39; G01P 15/097

USPC ..................... 73/514.29; 427/100
See application file for complete search history.

(56) References Cited

U.S. PATENT DOCUMENTS 3,209,601 A   10/1965 Stiles
4,809,552 A    3/1989 Johnson
(Continued)

FOREIGN PATENT DOCUMENTS

JP   62-124777   6/1987
JP   4-361165    12/1992
(Continued)

OTHER PUBLICATIONS

Japanese Office Action issued Dec. 22, 2014, in Patent Application No. 2012-534681 with English translation.
(Continued)

*Primary Examiner* — Hezron E Williams
*Assistant Examiner* — Tarun Sinha
(74) *Attorney, Agent, or Firm* — Oblon, McClelland, Maier & Neustadt, L.L.P.

(57) ABSTRACT

An in-plane MEMS or NEMS detection device for measuring displacements directed along a direction including a seismic mass suspended with respect to a substrate, the seismic mass being pivotable about an axis perpendicular to the plane of the substrate, at least one piezoresistive strain gauge mechanically connected to the seismic mass and the substrate, wherein the piezoresistive gauge has a thickness lower than that of the seismic mass, and wherein the axis of the piezoresistive strain gauge is orthogonal to the plane containing the pivot axis and the center of gravity of the seismic mass and the plane is orthogonal to the direction of the displacements to be measured.

22 Claims, 12 Drawing Sheets

(56) References Cited

U.S. PATENT DOCUMENTS

| | | | |
|---|---|---|---|
| 6,145,380 | A | 11/2000 | MacGugan |
| 8,156,807 | B2 | 4/2012 | Robert |
| 2006/0201251 | A1 | 9/2006 | Sato et al. |
| 2007/0084041 | A1 | 4/2007 | Eklund et al. |
| 2007/0222011 | A1* | 9/2007 | Robert et al. ............ 257/415 |
| 2009/0139342 | A1 | 6/2009 | Robert et al. |

FOREIGN PATENT DOCUMENTS

| | | |
|---|---|---|
| JP | 07-049280 | 2/1995 |
| JP | 9-505396 | 5/1997 |
| JP | 2007-316056 | 12/2007 |
| JP | 2009-2953 | 1/2009 |
| JP | 2009-133862 | 6/2009 |
| WO | WO 92/15018 | 9/1992 |
| WO | WO 95/13545 A1 | 5/1995 |

OTHER PUBLICATIONS

French Preliminary Search Report issued Jun. 3, 2010, in Patent Application No. 0957462 (with English Translation of Category of Cited Documents).

E. Jesper Eklund, et al., "Single-Mask SOI Fabrication Process for Linear and Angular Piezoresistive Accelerometers with On-Chip Reference Resistors", A.M. Sensors, Oct. 30-Nov. 3, 2005, pp. 656-659.

E. Jesper Eklund, et al., "Single-mask fabrication of high-G piezoresistive accelerometers with extended temperature range", Journal of Micromechanics and Microengineering, vol. 17, 2007, pp. 730-736.

Samaun, Kensall D. Wise, et al., "An IC Piezoresistive Pressure Sensor for Biomedical Instrumentation", J. Solid-State Circuts Conference, Digest of Technical Papers, vol. XIV, Feb. 1971, 19 pages.

Lynn Michelle Roylance, et al., "A Batch-Fabricated Silicon Accelerometer", IEEE Transactions on Electron Devices, vol. Ed. 26, No. 12, Dec. 1979, pp. 1911-1917.

Thomas Lisec, et al., "Surface Micromachined Piezoresistive Pressure Sensors with Step-Type Bent and Flat Membrane Structures", IEEE Transactions on Electron Devices, vol. 43, No. 9, Sep. 1996, pp. 1547-1552.

Aaron Partridge, et al., "A High-Performance Planar Piezoresistive Accelerometer", Journal of Microelectromechanical Systems, vol. 9, No. 1, Mar. 2000, pp. 58-66.

International Search Report issued Feb. 10, 2011 in Application No. PCT/JP2010/065780.

M. Aikele, et al., "Resonant accelerometer with self-test", Sensors and Actuators A vol. 92, 2001, pp. 161-167.

Office Action issued Apr. 7, 2014 in Japanese Patent Application No. 2012-534681 (with English translation).

* cited by examiner

IN-PLANE PIEZORESISTIVE DETECTION SENSOR

TECHNICAL FIELD AND PRIOR ART

The present invention relates to an in-plane piezoresistive detection sensor.

The field of the invention is in particular that of micro/nanosensors, accelerometers and inertial sensors.

The sensor is called in-plane, when the sensitive axis of displacement of the seismic or movable mass is located in a plane parallel to the substrate, as opposed to an out-of-plane sensor wherein the seismic mass is displaced along a direction perpendicular to the substrate.

There are NEMS (microelectromechanical systems) or NEMS (nanoelectromechanical systems) accelerometers comprising a suspended seismic mass provided with fingers, said fingers being interdigitated with fingers carried by a fixed part. The variation in capacitance between the fingers is measured and enables displacement of the mass to be determined and the acceleration of the mass to be acceded.

It is attempted to reduce the size of these systems, but by reducing the dimensions, the sensitivity of the systems also tends to be reduced. Indeed, the structure tends to be "relatively stiffened" with respect to the inertial forces.

There is also an accelerometer of the type comprising a seismic mass for being displaced under the effect of external forces, suspended by a beam forming a rotational axis for the mass and one or more piezoresistive gauges capable of detecting the displacement of the seismic mass. Such an accelerometer is known from document US 2007/0084041 and the article <<Single-mask SOI fabrication process for linear and angular piezoresistive accelerometers with on-chip reference resistors>>—Jesper Eklund, E.; Shkel, A. M. —Sensors, 2005 IEEE—30 Oct.-3 Nov. 2005 Page(s): 656-659.

The accelerometer described in these documents comprise a seismic mass suspended by a beam defining a hinge and two piezoresistive gauges provided on either side of the beam and parallel to the same. This accelerometer is for measuring accelerations in the plane of the structure and orthogonal to the beam.

On the one hand, this accelerometer has a low sensitivity.

On the other hand, this accelerometer is very sensitive to transverse accelerations, i.e. directed parallel to the axis of the beam, since the sensitive axis of piezoresistive gauges is parallel to this transverse direction.

Consequently, one object of the present invention is to provide a device with an enhanced piezoresistive detection in the sensitivity plane, while offering a reduced sensitivity to transverse displacements.

DESCRIPTION OF THE INVENTION

The object previously set out is achieved by an in-plane piezoresistive detection device, comprising a seismic mass suspended by at least one beam also forming a pivot connection of an axis orthogonal to the plane of the device, the mass being displaceable in the plane about this axis, and at least one piezoresistive gauge. The gauge(s) has (have) a thickness reduced with respect to that of the seismic mass, the axis connecting the pivot connection axis and the centre of gravity of the seismic mass is perpendicular to the direction of the accelerations to be measured and the axis of the gauge is perpendicular to the axis connecting the pivot connection axis and the centre of gravity of the seismic mass.

The reduced thickness of the piezoresistive gauge enables stresses to be concentrated, increasing its sensitivity. Furthermore, since the piezoresistive gauge has a very low flexion sensitivity, the particular arrangement of the gauge gives the device a very low sensitivity to transverse displacements. This very low sensitivity to transverse accelerations is even enhanced by the particular configuration of the rotational axis of the seismic mass and the centre of gravity of the seismic mass.

The subject-matter of present invention is then mainly an in-plane MEMS or NEMS detection device for measuring displacements directed along a direction comprising a seismic mass suspended with respect to a substrate, said seismic mass being pivotable about an axis perpendicular to the plane of the substrate, at least one piezoresistive strain gauge suspended between the seismic mass and the substrate, and mechanically and electrically directly connected to the seismic mass on the one hand and to an embedding pad anchored to the substrate on the other hand, the seismic mass being in turn suspended with respect to the substrate by at least one beam, said at least one beam being connected to the substrate at an area distinct from that by which the gauge is connected to the substrate, wherein said piezoresistive gauge has a thickness lower than that of the seismic mass, and wherein the axis of the piezoresistive gauge is orthogonal to the plane containing the pivot axis and the centre of gravity of the seismic mass and said plane being orthogonal to the direction of the displacements to be measured, i.e. the axis of the gauge is parallel to the direction of the accelerations to be detected.

Particularly advantageously, the mechanical connection between the piezoresistive gauge, and the seismic mass is located on or as close as possible to the plane containing the centre of gravity and the pivot axis.

For example, the seismic mass comprises a recess receiving the end of the gauge for being connected to the seismic mass, said end of the gauge being connected to the bottom of the recess, the bottom of the recess being located in or as close as possible to the plane containing the centre of gravity and the pivot axis.

Advantageously, the seismic mass can be provided to comprise an in-plane tapered area at its connection with the piezoresistive gauge.

The thickness of the seismic mass and that of the piezoresistive gauge are advantageously between a few tens µm and a few hundred µm.

The plane containing the pivot axis and the centre of gravity advantageously forms a plane of symmetry for means for suspending the seismic mass.

For example, the means maintaining the seismic mass suspended and carrying the rotational axis of the mass comprise at least one beam having a thickness equal to or higher than that of the piezoresistive gauge and lower than that of the seismic mass.

In one advantageous example, the at least one beam of the means maintaining the seismic mass suspending and carrying the rotational axis of the mass is substantially provided in the plane containing the centre of gravity, parallel to the plane of the substrate.

In another exemplary embodiment, the means maintaining the seismic mass suspended and carrying the rotational axis of the mass comprise at least one beam having a thickness equal to the thickness of the seismic mass.

Said means maintaining the seismic mass suspended and carrying the rotational axis of the mass can comprise two beams of substantially the same length anchored to the substrate at two distinct points and anchored to the seismic mass at a point through which the pivot axis passes.

The in-plane MEMS or NEMS detection device according to the invention can advantageously comprise two piezoresistive gauges mounted as a differential symmetrically with respect to said plane. The mounting of both piezoresistive gauges mounted as a differential is associated with a Wheatstone half-bridge mounting.

Another subject-matter of the present invention is also a method for making the in-plane MEMS or NEMS detection device according to the present invention, this method comprising:

forming a first thin area, having a first thickness forming at least one piezoresistive gauge;

forming a second thick area, having a second thickness higher than the first thickness forming at least one seismic mass.

The first thin area can be made by forming a portion of a second sacrificial layer within a layer of semi-conducting material, and etching this portion and a first sacrificial layer.

Forming a portion of a second sacrificial area within a layer of the semi-conducting material can comprise:

etching a first layer of semi-conducting material which is located on the first sacrificial layer, depositing and etching the second sacrificial layer to define said portion, making a second layer of semi-conducting, conducting or insulating material.

In one exemplary embodiment, making the second layer of semi-conducting material is achieved by epitaxial growth.

In another exemplary embodiment, the second layer of semi-conducting material is a polycrystalline semi-conductor.

Forming a third area, called hinge area, with a thickness can occur between forming the first area and forming the second area.

For example, the first area and the third area are obtained by etching steps independent from each other. Etching the third area can be performed before etching the first and second areas, for example through DRIE.

BRIEF DESCRIPTION OF THE DRAWINGS

The present invention will be better understood using the description which follows and the appended drawings wherein.

DETAILED DESCRIPTION OF PARTICULAR EMBODIMENTS

Figure 1A:
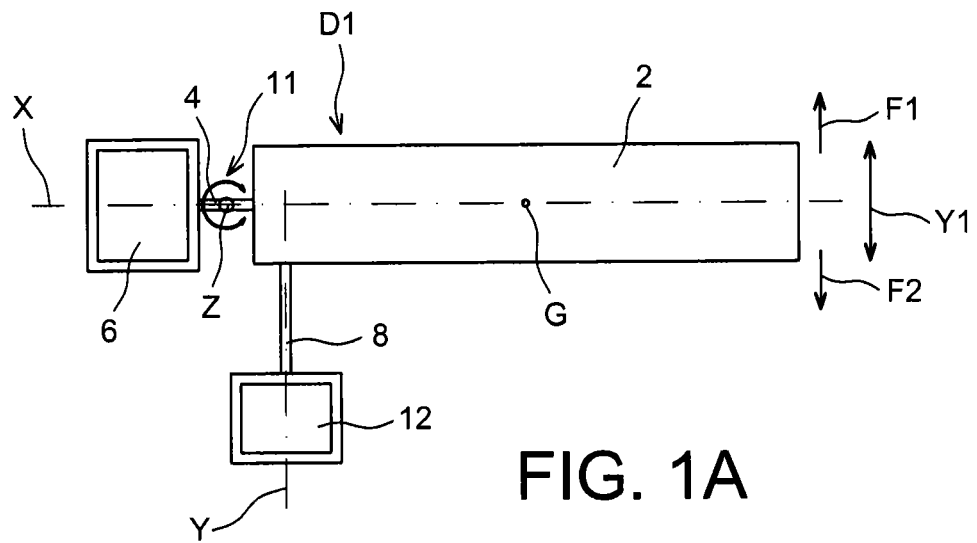
FIGS. 1A and 1B are top and side views respectively of a first embodiment of a device according to the present invention.
Figure 1B:
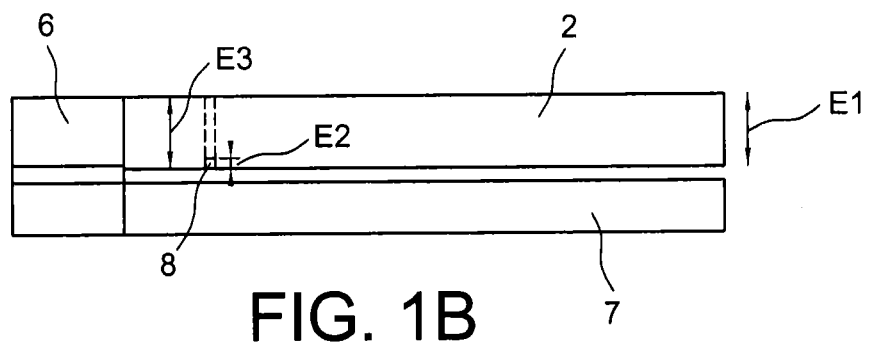

In FIGS. 1A and 1B, a first exemplary embodiment of the device according to the present invention can be seen.

The piezoresistive gauge detection device D1 comprises a seismic mass 2 for being moved under the effect of an external strain, for example under the effect of an acceleration in the case of an accelerometer. The accelerations parallel to a direction Y1 are to be measured.

The seismic mass 2 is suspended above a substrate 7 by means of a beam 4 connected to an embedding pad 6, fixed to the substrate 7. The beam 4 keeps the seismic mass substantially parallel to the substrate 7.

The device D1 also comprises a piezoresistive strain gauge 8, of the type suspended beam between the seismic mass 2, having an axis Y and a second embedding pad 12. The axis Y of the gauge 8 extends in the direction of the greatest dimension of the gauge 8.

The beam 4 has a longitudinal axis X. The beam 4 forms a hinge 11 or pivot connection with an axis Z perpendicular to the plane of the substrate, about which the seismic mass will pivot under the effect of the acceleration. The plane of the substrate will be designated XY.

The axis X and the axis Z define a plane of symmetry of the beam, perpendicular to the plane of the substrate, more generally means for suspending and hinging the mass on the substrate. The centre of gravity G of the seismic mass 2 is contained in said plane XZ. The device is directed such that the plane containing the axis Z and the centre of gravity G is perpendicular to the direction Y1.

According to the present invention, the gauge 8 has an axis Y parallel to the direction Y1 and perpendicular to the plane containing the axis Z of the pivot connection 11 and the centre of gravity G.

The operation of a piezoresistive strain gauge will be reminded below. When the gauge is deformed along its axis, and its length varies, its electric resistance also varies, and by measuring this variation in resistance, the displacement of the seismic mass can be deduced and the external acceleration determined. The variation in the electric resistance is measured by flowing an electric current in the gauge 8.

Consequently, due to the orientation of the gauge 8 according to the present invention, the device D1 is not very sensitive to the transverse displacements, i.e. the displacements along the direction orthogonal to the direction Y1, because they apply to the gauge 8, a flexion strain, to which the gauge 8 is not very sensitive.

Furthermore, the device is also not very sensitive to temperature, because in the case of an expansion of the beam, the temperature also applies a flexion strain to the gauge 8, to which it is not sensitive.

Besides, as can be seen in the cross-section view of FIG. 1B, the seismic mass 2 has a thickness E1, higher than the thickness E2 of the gauge 8. For example, E1 is between a few µm and a few tens µm, for example 50 µm and E2 is between 0.1 µm and 0.5 µm.

The hinge beam 4 has a thickness E3, in the example represented, it is equal to E1, however it could be equal to E2 or between E2 and E1.

The reduction in thickness of the gauge 8, and thus in its cross-section, enables the stresses it undergoes due to the displacement of the seismic mass 2 to be concentrated, in a reduced cross-section, which results in increasing the sensitivity of the detection device D1.

Due to the manufacturing method, the face of the gauge 8 facing the substrate 7 is located in the same plane as the face of the seismic mass 2 facing the substrate 7.

Means (not shown) for applying a constant tension to the gauge, and for measuring a variation in the current flowing in the gauge and processing the current direction measurements are associated with the device D1.

In the example represented, the current flows between the embedding pad 12 of the gauge and the embedding pad 6 of the beam 4, via the gauge 8 and the hinge.

In one alternative, the use of a gauge formed by two serially electrically connected strands can be provided, the current measured flowing in one direction in the first contact strand towards the ground, and then in the second strand from the ground to the pad 12.

The configuration according to the present invention has the advantage of offering the lever effect, the axis connecting the pivot axis Z and the centre of gravity G acting as the lever, the latter pivoting about the pivot axis Z. The strain applied to the centre of gravity G is amplified by the lever effect at the anchoring of the gauge 8 on the seismic mass 2. Consequently, even a low acceleration can be detected.

The operation of this detection device will be now be explained.

The device D1 is provided within an environment the acceleration of which is desired to be measured, for example is attached to an object the acceleration of which is desired to be measured. The orientation of the gauge 8 is such that the axis Y of the piezoresistive gauge 8 is parallel to the direction of the acceleration to be measured.

When the environment experiences such an acceleration, the seismic mass 2 is moved about the axis Z, in the direction of the arrow F1 or in the direction of the arrow F2. This displacement of the seismic mass 2 applies stresses on the piezoresistive gauge 8, either tensile stresses if the displacement is in the direction F1, or compressive stresses if the displacement is in the direction F2.

These stresses applied to the gauge 8 cause a variation in the electric resistance of the gauge, which is then measured via the variation in the current flowing in the gauge. This variation in resistance enables the amplitude of the displacement of the seismic mass 2 to be determined and the value of the acceleration applied to the environment to be deduced therefrom.

Figure 2:
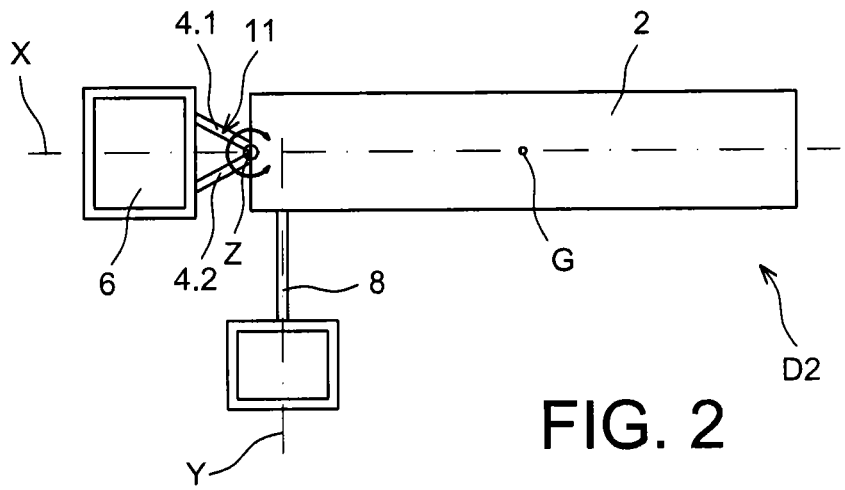
FIG. 2 is a top view of an alternative device of FIGS. 1A and 1B.

In FIG. 2, an alternative of the device of FIGS. 1A and 1B can be seen, wherein the hinge or pivot connection is no longer made by a single beam 4 which is flexible in the plane but by two beams 4.1 and 4.2 which are flexible in the plane, connected by one end to the pad 6 at two distinct points and by another end on the seismic mass 2 at a common point and defining the pivot axis Z at the common point of attachment to the seismic mass 2. This configuration has the advantageous effect of obtaining a pure or nearly pure rotation of the seismic mass 2 around the axis Z.

The operation of the device D2 is identical to that of the device D1.

Figure 3:
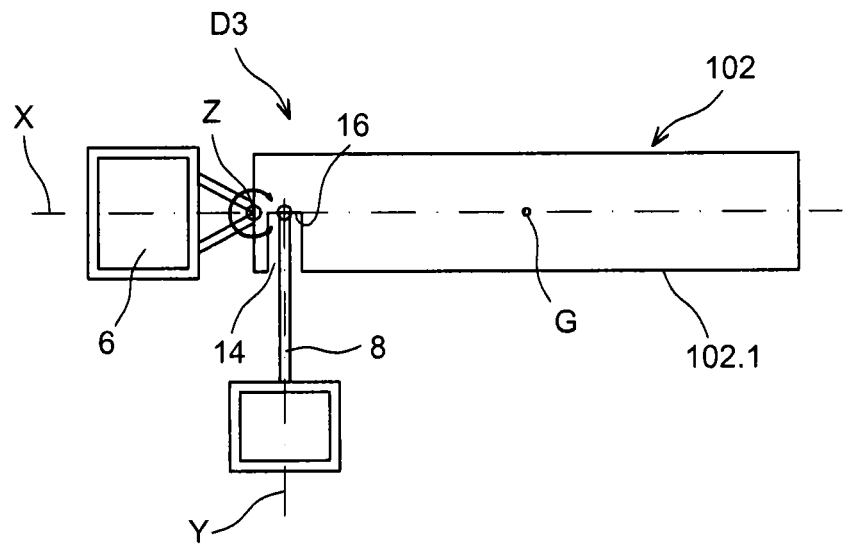
FIG. 3 is a top view of a first example of a second advantageous embodiment of an in-plane detection device according to the present invention.

In FIG. 3, a particularly advantageous second embodiment of a detection device D3 according to the invention can be seen.

In this embodiment, the end of the strain gauge 8 integral with the seismic mass 102 is connected thereto on the axis X passing through the pivot axis Z and the centre of gravity G of the seismic mass 102.

This configuration has the advantage that all or almost all the stress intensity applied by the displacement of the seismic mass 102 takes part in the deformation along the axis Y of the strain gauge 8. Indeed, when the anchoring of the gauge 8 is shifted with respect to the axis passing through the pivot connection and the centre of gravity G, as is the case in the first embodiment, part of the deformation stress exerts a flexion strain combined to a compressive or tensile strain on the gauge, wherein this flexion strain takes no or little part in the variation in the electric resistance of the piezoresistive gauge 8.

In the example represented in FIG. 3, the seismic mass 102 comprises a recess 14 in its side face 102.1 on the gauge 8 side, this recess comprising a bottom 16 aligned with the axis X, thus enabling the gauge 8 to connect to the seismic mass 102 at the bottom 16 of the recess 14. The pivot connection with the axis Z is made, as for the device D2, by two beams tilted towards each other.

A seismic mass comprising such a recess but the bottom of which is not aligned with the axis X does not depart from the scope of the present invention, but enables the connection between the gauge and the mass of the axis X to be closer.

Figure 4:
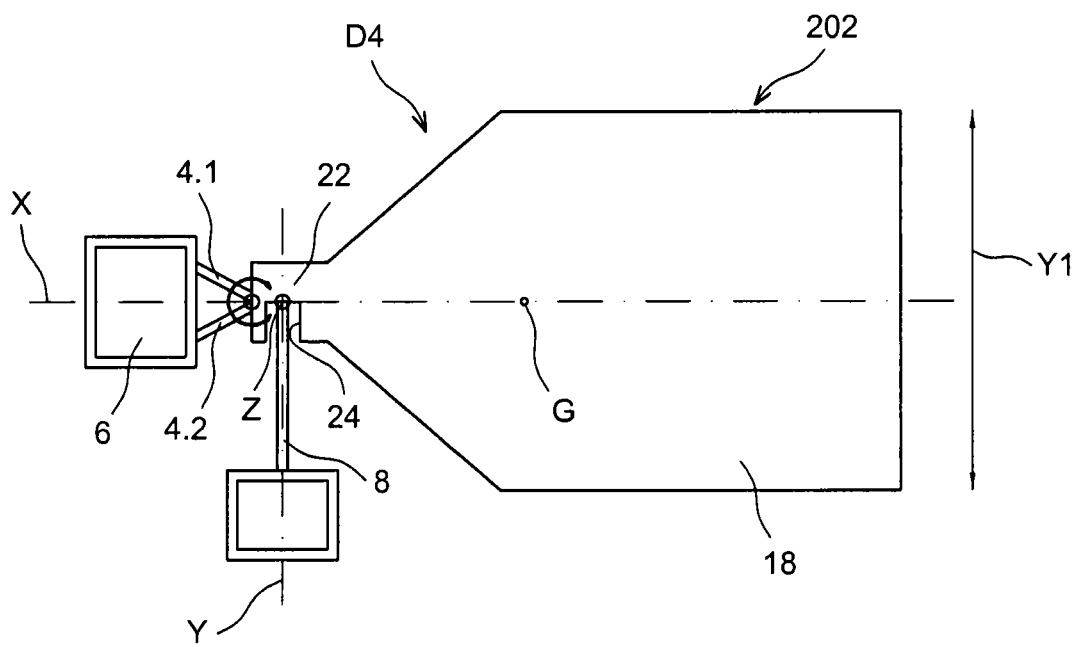
FIG. 4 is a top view of a second example of the second embodiment of a detection device according to the present invention.

In FIG. 4, a second exemplary detection device D4 according to the second embodiment can be seen, wherein the shape of the seismic mass 102 is changed.

The seismic mass 202 comprises, in this example, a first parallelepiped part 18 with a greater width, a second trapezoidal part 20 the large base of which is common to a side of the first part and a third part 22 connected to the pivot means on the one hand and to the strain gauge 8 on the other hand. The movable mass 202 has substantially a symmetry with respect to the axis X.

The third part 22 is also parallelepiped shaped, it has a smaller width identical to the small base of the second part, comprising a recess 24 to enable the gauge to be connected to a seismic mass in a place located on or as close as possible to the axis X. The depth of the recess 24 is reduced with respect to that of the recess 14 of the device D3 of FIG. 3.

The seismic mass 202 is generally monolithic, the division into three parts aims at simplifying the description, and is not necessarily representative of the industrial implementation.

This tapered shape of the seismic mass 202 at the connection between the seismic mass 202 and the gauge 8 enables a short piezoresistive gauge 8 to be implemented. Indeed, by releasing the area of connection of the gauge 8 to the seismic mass, it is possible to bring the anchoring pad 12 closer to that area and thereby to implement a shorter gauge. Implementing a short gauge enables a gauge with a reduced electric resistance to be available and thereby the measurement noise to be decreased.

The pivot connection with the axis Z is made, as for the device D2, by two beams tilted towards each other.

It is to be noted that the third part 22 to which the gauge is connected is made such that it has a rigidity higher than that of the pivot connection Z in order for the seismic mass 202 to pivot about the axis Z and not about an axis perpendicular to the substrate and located at the third part 22.

In the examples described above, the hinge beam(s) has (have) a thickness equal to that of the seismic mass, this has the advantage offering a device not very sensitive to transverse accelerations and with a simplified implementation, since the hinge is made at the same time as the mass.

Figure 5:
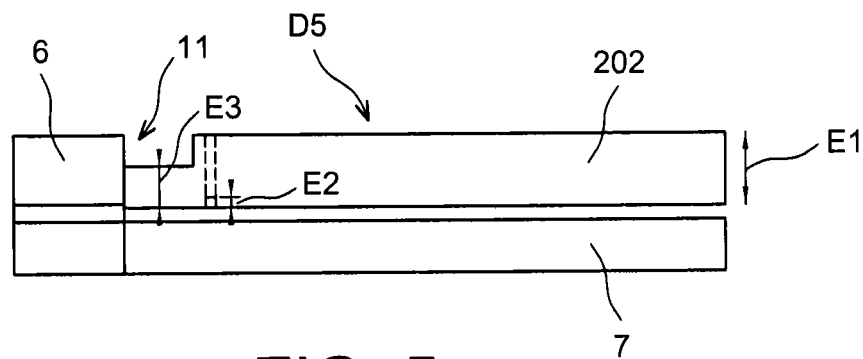
FIG. 5 is a side view of an alternative of device of FIG. 4, wherein the thickness of the hinge is reduced with respect to that of the seismic mass, FIG. 5' is an alternative of device of FIG. 5.
Figure 5:
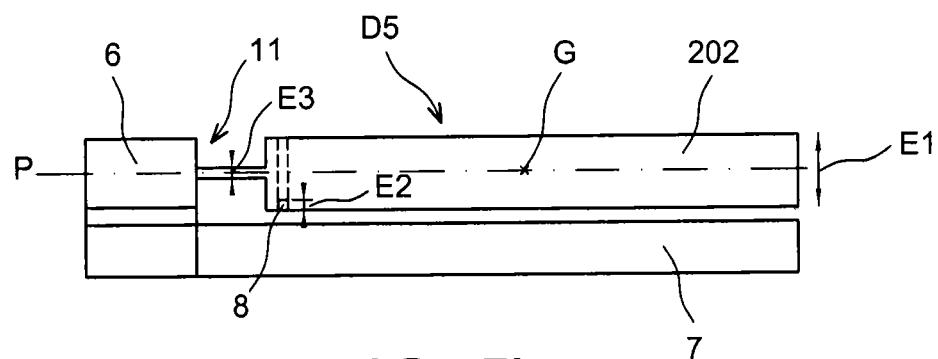

In FIG. 5, a cross-section view of a device D5 very similar to D4 can be seen, however in this case, the thickness E3 of the beams forming the pivot connection is lower than the thickness E1 of the seismic mass 202 and higher than that of the gauge 8.

This thinning of the hinge enables the sensitivity of the device to be further increased.

In a particular advantageous example represented in FIG. 5', the hinge has a reduced thickness E3 and is located in a plane parallel to the plane of the substrate and containing the centre of gravity G of the seismic mass 202. This arrangement enables the sensitivity to transverse accelerations to be further reduced. E3 can be lower than the thickness E2 of the gauge 8.

Figure 6:
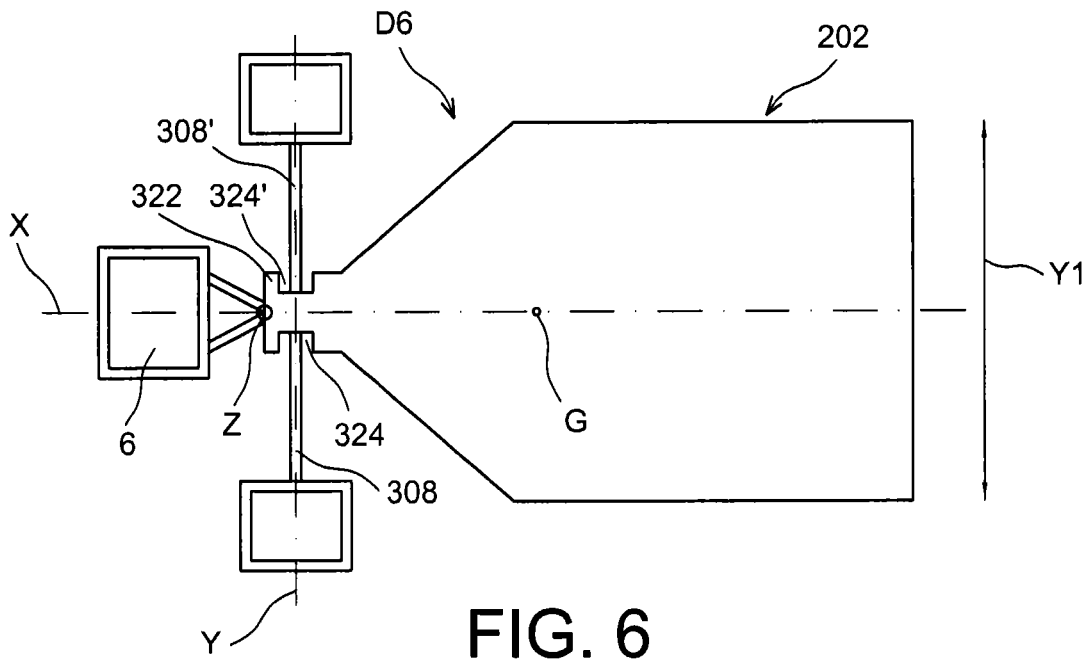
FIG. 6 is a top view of a measurement device according to the second embodiment, wherein the piezoresistive gauges are mounted as a differential.

In FIG. 6, another exemplary embodiment of the detection device D6 according to the second embodiment can be seen, which comprises two piezoresistive gauges 308, 308' mounted as a differential. The seismic mass 202 has in this example a tapered shape, but this is in no way limiting.

The gauges are symmetrically provided with respect to the axis X. The seismic mass 202 comprises a third part 322 provided with two recesses 324, 324' symmetric with respect to the axis, such that both gauges 308, 308' are connected to the seismic mass 202 as close as possible to the axis X. The axes of both gauges 308, 308' are orthogonal to the plane containing the rotational axis Z and the centre of gravity G.

The dimensions of the third part 32 are selected such that its rigidity is higher than that of the pivot connection about the axis Z.

This differential mounting enables to get rid of the effect of variations in temperature.

Figure 7:
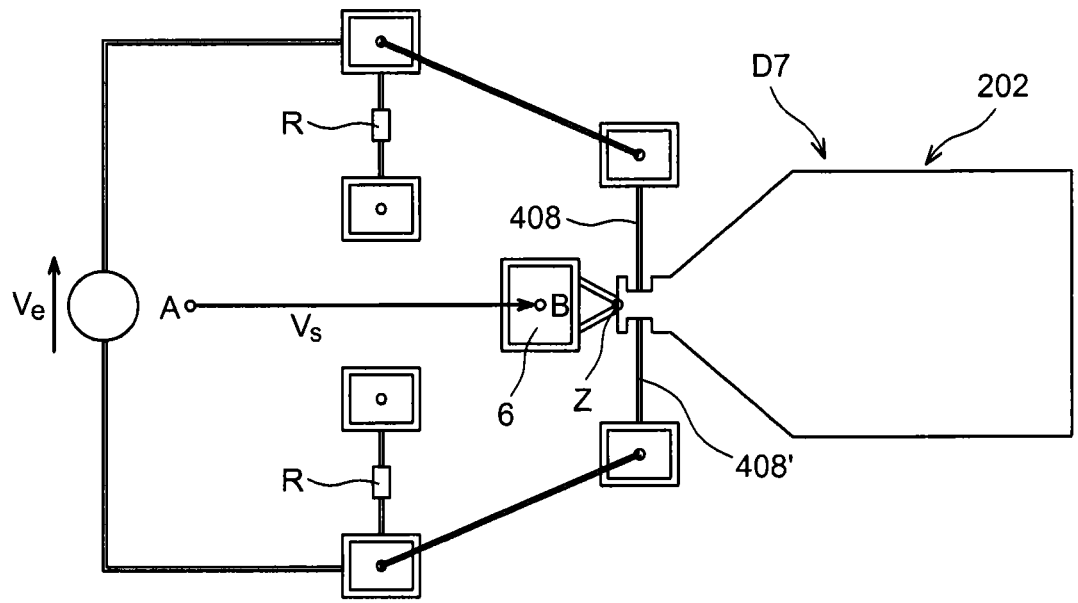
FIG. 7 is a top view of a measurement device according to the second embodiment which is provided with Wheatstone bridge mounted differential piezoresistive gauges.

In FIG. 7, another exemplary embodiment of a detection device D7 can be seen, which comprises piezoresistive gauges 408, 408' mounted as a differential associated with a Wheatstone bridge mounting, more precisely a Wheatstone half-bridge.

The resistance of the gauge 408' is designated R+dR and the resistance of the gauge 408 is designated R−dR. Indeed, the resistances of both gauges 408, 408' oppositely vary.

A voltage $V_e$ is applied and a voltage $V_s$ is measured between the point A and the point B which is herein located on the pad 6 for anchoring the beams forming the pivot connection about the axis Z, which is at the same potential as the connection point of both gauges 408, 408'.

The other resistances have a value R.

By applying the Milman theorem, it is obtained $$V_{output} = \frac{V_{input}}{2} \frac{dR}{R}$$

It is deduced therefrom $$dR = 2R \frac{V_{output}}{V_{input}}$$

From this measurement of variation in resistance due to the displacement of the seismic mass 202, the acceleration undergone by the device can be deduced.

A Wheatstone bridge mounting can also be made, in this case, preferably, two movable masses each associated with two differential mounted piezoresistive gauges are used.

This mounting enables the sensitivity of the detection device according to the present invention to be further increased.

In the examples represented, the mass is solid, however it can also be recessed. Besides, depending on the manufacturing methods, ports can be made to release the mass.

Thanks to the present invention, by reducing the cross-section of the piezoresistive gauge(s), a significant gain on the sensitivity of the piezoresistive detection device can be achieved.

Besides, making the seismic mass and the piezoresistive gauge with different thicknesses enables them to be decoupled and thus separately optimized.

Furthermore, by positioning the beam for suspending the seismic mass and the piezoresistive gauge at right angles, the transverse sensitivity of the accelerometer is strongly limited.

Besides, the advantage of an amplification of the stress applied to the gauge by a lever effect is obtained.

Furthermore, with the connecting area of the piezoresistive gauge on or as close as possible to the axis connecting the pivot axis and the centre of gravity, the stress due to the displacement is fully or almost fully axial.

Advantageously, the distance between the connecting area and the axis connecting the pivot axis and the centre of gravity is in the order of one μm. By way of example, in the case of a mass with a 300 μm length, a 200 μm width and a 15 μm thickness, and a gauge with a 4 μm length, a 0.15 μm thickness and a 0.25 μm width, this distance is in the order of 2 μm.

Several exemplary embodiments of methods for making a piezoresistive detection device according to the present invention will now be described.

In FIGS. 8A to 8G, the different steps of a first example of a method for making the device according to the present invention can be seen.

First, there is a SOI (silicon on insulator) substrate comprising for example a silicon layer 26, a silicon oxide layer (buried oxide) 28 with a 1 μm thickness, and a silicon layer 30, for example with a 0.3 thickness on the layer 28. The layer 28 forms a sacrificial layer. The stack could also be made by transferring the Si layer 30 onto the stack of layers 26 and 28, or a deposition of this layer 30 could be performed onto the layer 28. Preferably, the layer 30 is of single crystal silicon.

Figure 8A:
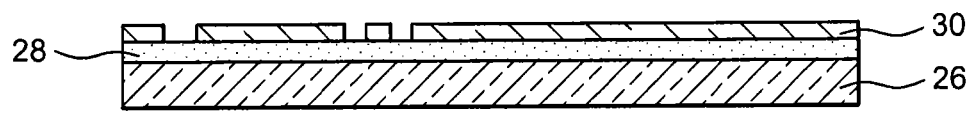
FIGS. 8A to 8G are schematic representations of the steps of a first exemplary method for making the device according to the present invention.

A photolithography is then made, followed by an etching of the silicon layer 30 to define the piezoresistive gauge 8 and define the contact area with the substrate. The etching is stopped on the $SiO_2$ layer (FIG. 8A).

Figure 8B:
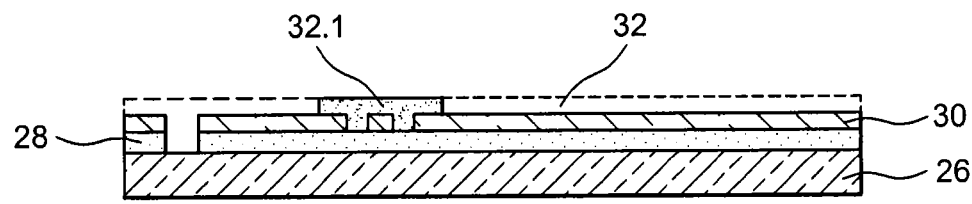

During a following step represented in FIG. 8B, a $SiO_2$ layer 32 is deposited, for example with a 0.3 μm thickness, for forming a barrier layer.

Then, a photolithography is performed for bounding a portion 32.1 of the layer 32 covering the piezoresistive gauge. An etching of the layer 32 is then performed, suppressing the same except at the portion 32.1. The $SiO_2$ in the contact area with the substrate is also etched. A stripping can be performed to suppress the etching and mask residues.

Figure 8C:
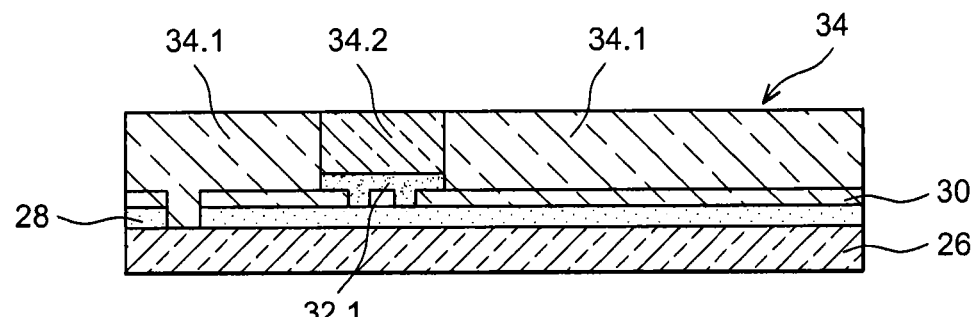

During a following step represented in FIG. 8C, a deposition of a Si layer 34 is performed by an epitaxial growth on the Si layer 30 and on the $SiO_2$ portion 32.1. This layer has for example a 20 μm thickness, and comprises a part 34.1 made up of single crystal silicon and a part 34.2 made up of polycrystalline silicon above the $SiO_2$ portion 34.1. A chemical-mechanical polishing of the free surface of the layer 34 can be performed in order to suppress the planeness defect introduced by the portion 32.1.

Figure 8D:
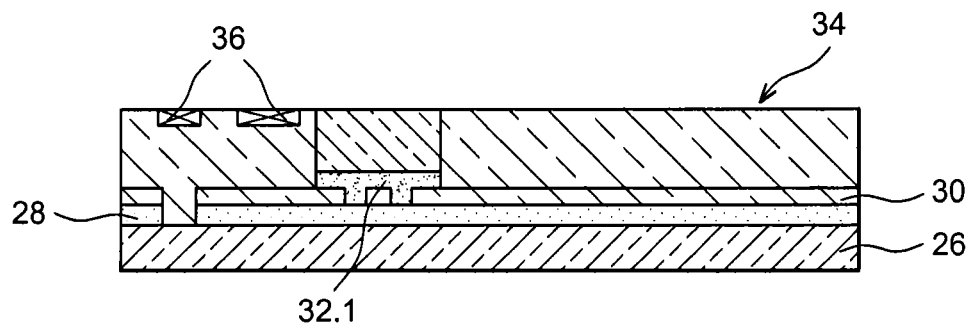

During a following step represented in FIG. 8D, a photolithography is performed to define the location of the contact pads 36. Then, a removal of the mask parts at these locations and an implantation at these pads 36 are performed. An annealing step is then performed.

Figure 8E:
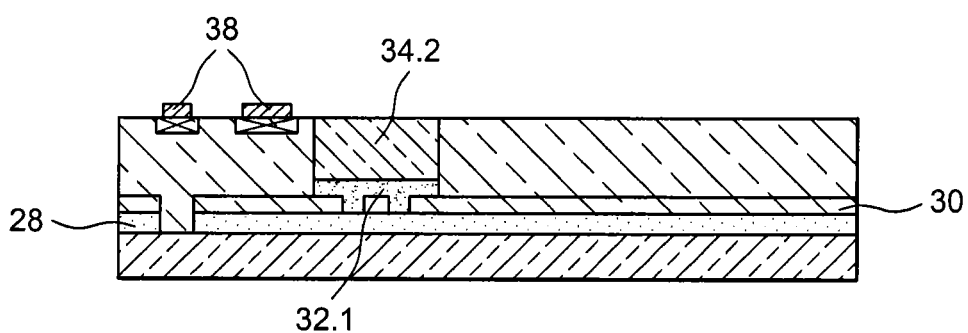

During a following step represented in FIG. 8E, a deposition of a metal layer wherein the electric contacts 38 will be made is performed. Then, a photolithography is performed on this layer protecting the metal layer above the pads 36. The metal layer is then etched, only leaving the contacts 38. A stripping can be performed to suppress the etching and mask residues.

Figure 8F:
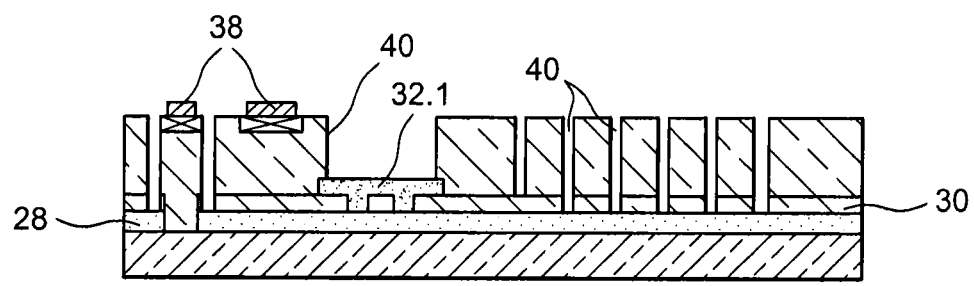

During a following step represented in FIG. 8F, a photolithography is performed for enabling the layer 34 to be selectively etched, in particular to suppress the portion 34.1 above the piezoresistive gauge and to define the mask, the anchoring pads and the contacts with the layer 26. Then, vertical etchings 40 are performed in the thickness of the layer 34 up to the oxide layer 28 and the oxide portions 32.1 for example through DRIE (Deep Reactive Ion Etching).

Then a stripping is performed to suppress the etching residues.

Figure 8G:
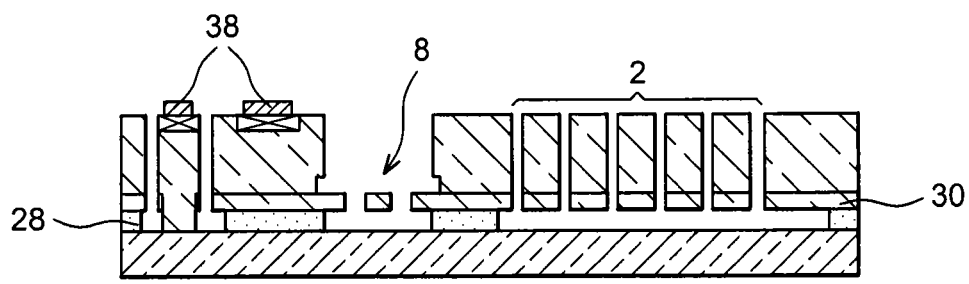

During a following step represented in FIG. 8G, the seismic mass 2 and the hinge are released, by removing the oxide layer 28 and the piezoresistive gauge 8 by removing the portion 32.1, for example by means of liquid sulphuric acid and/or steam. This is an etching over time. The sulphuric acid is left in contact with the oxide layer 28 and the oxide for the time necessary to release the seismic mass while leaving some sacrificial layer under the fixed parts of the system.

In FIGS. 9A to 9G, another exemplary method for making a piezoresistive detection device according to the present invention can be seen.

First, there is a SOI (silicon on insulator) substrate comprising for example a silicon layer 126, a silicon oxide layer (buried oxide) 128 with a 1 µm thickness, and a silicon layer 130, for example with a 0.15 µm thickness on the layer 128. Advantageously, the layer 130 is of single crystal Si.

Figure 9A:
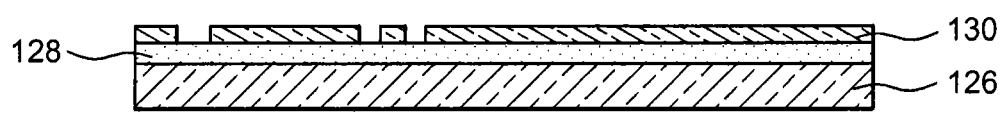
FIGS. 9A to 9G are schematic representations of the steps of a second exemplary method for making the device according to the present invention.

Then, a photolithography is performed, followed by an etching of the silicon layer 130 to define the piezoresistive gauge 8 and to define the contact area with the substrate. The etching is stopped on the SiO$_2$ layer (FIG. 9A).

Figure 9B:
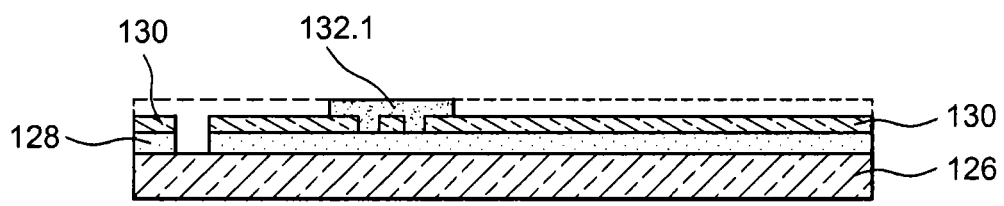

During a following step represented in FIG. 9B, a deposition of SiO$_2$ layer 32 is performed, for example with a 0.3 µm thickness, for forming a barrier layer.

Then, a photolithography is performed for bounding a portion 132.1 of the layer 132 covering the piezoresistive gauge. An etching of the layer 132 is then performed, suppressing the same except at the portion 132.1. The SiO$_2$ in the contact area with the substrate is also etched. A stripping can be performed to suppress the etching and mask residues.

Figure 9C:
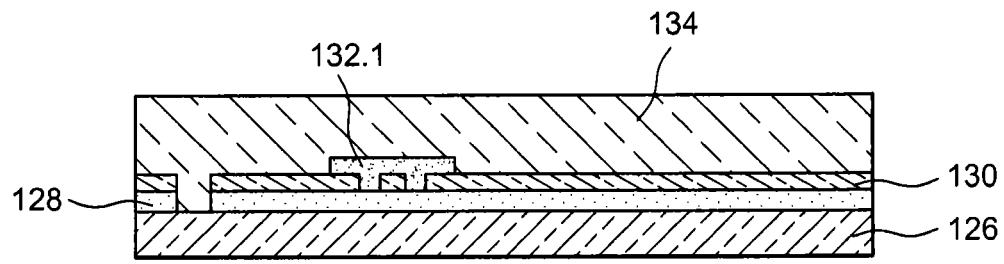

During a following step represented in FIG. 9C, a deposition of a polycrystalline Si layer 134 is performed on the Si layer 30 and on the SiO$_2$ portion 132.1. This layer has for example a 15 µm thickness. A chemical-mechanical polishing of the free surface of the layer 134 can be performed in order to suppress the planeness defect introduced by the portion 132.1. The layer 134 can also be a conducting or insulating material. Indeed, it is not necessary that the layer 134 is of the same material as that of the layer 130, because it is used to define the mass and the hinge, and not the gauge. In the case of an insulating material, a further step for recovering the electric contact on the silicon layer 126 is to be provided.

Figure 9D:
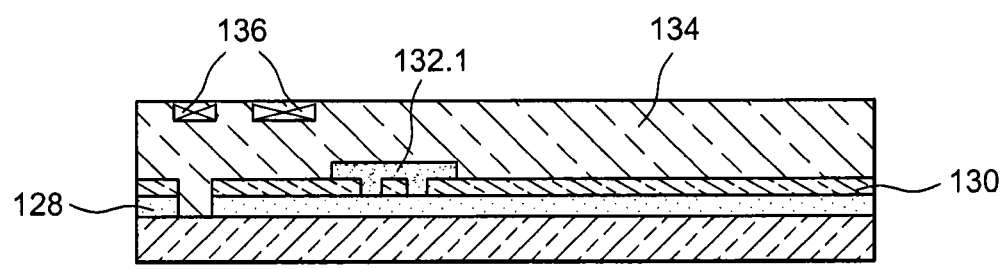

During a following step represented in FIG. 9D, a photolithography is performed to define the location of the contact pads 136. Then, a removal of the mask parts at these locations and an implantation at these pads 136 are performed. An annealing step is then performed.

Figure 9E:
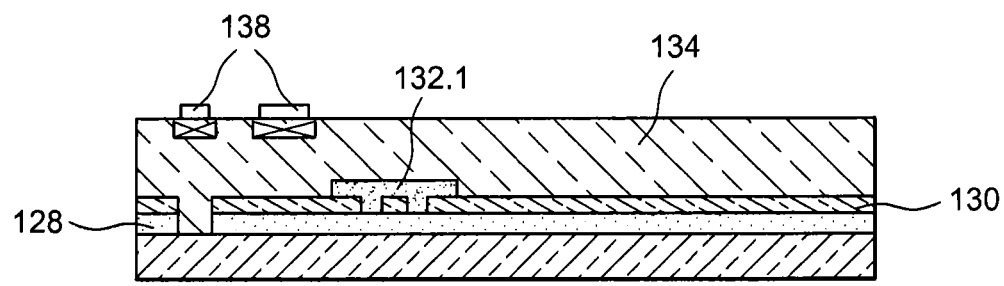

During a following step represented in FIG. 9E, a deposition of a metal layer wherein the electric contacts 138 will be made is performed. Then, a photolithography is performed on this layer protecting the metal layer above the pads 136. The metal layer is then etched, only leaving the contacts 138. A stripping can be performed to suppress the etching and mask residues.

Figure 9F:
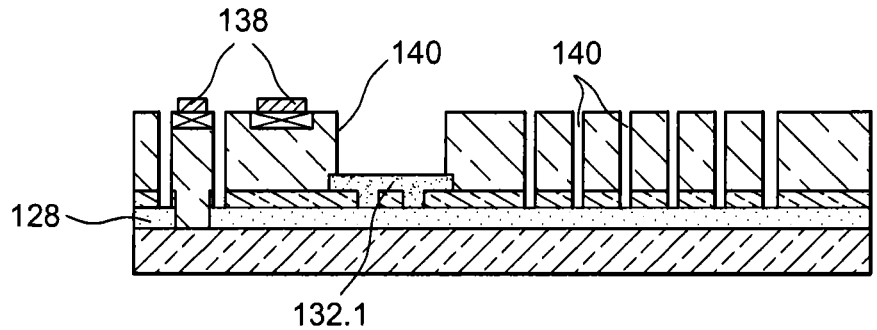

During a following step represented in FIG. 9F, a photolithography is performed for enabling the layer 134 to be selectively etched, in particular to suppress the portion above the piezoresistive gauge and define the mass, the anchoring pads and the contacts with the layer 126. Then, the vertical etchings 140 are performed in the thickness of the layer 134 up to the oxide layer 128 and the oxide portion 132.1 for example through DRIE (Deep Reactive Ion Etching).

A stripping is then performed to suppress the etching residues.

Figure 9G:
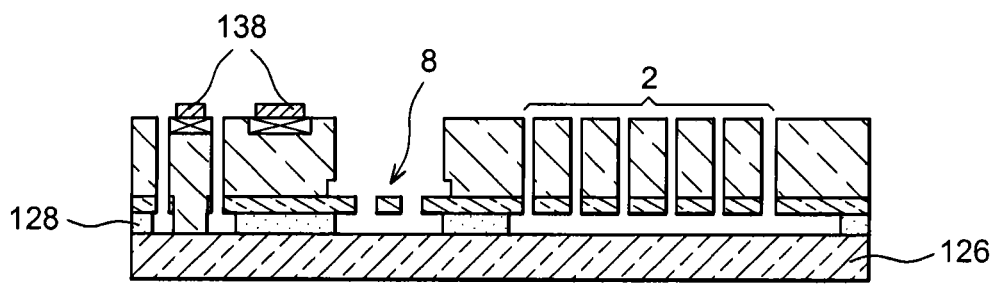

During a following step represented in FIG. 9G, the seismic mass 2 and the hinge are released, by removing the oxide layer 128 and the piezoresistive gauge 8 by removing the portion 132.1, for example by means of liquid sulphuric acid and/or steam. This is an etching over time. The sulphuric acid is left in contact with the oxide layer 128 and the oxide for the time necessary to release the seismic mass while leaving some sacrificial layer under the fixed parts of the system.

With the exemplary methods described above, one or more beams is (are) obtained defining the pivot connection the thickness of which is equal to that of the seismic mass. In the FIGS. 10A to 10G, another exemplary method is schematically represented for making a piezoresistive detection device according to the present invention, enabling one or more beams to be made forming the pivot connection the thickness of which is lower than that of the seismic mass and higher than that of the piezoresistive gauge, as in the device of FIG. 5. The steps 10A to 10E are similar to the steps 9A to 9E, and the above description of steps 9A to 9E is applicable and will not be repeated.

In step 10F, a photolithography is performed for enabling the polycrystalline silicon layer 134 to be partially removed on a depth p lower than the total depth h of the layer 134 in order to define the pivot connection 11. The removal of this portion of the layer 134 is achieved for example by DRIE (Deep Reactive Ion Etching) on a depth of about 5 µm. It is for example an etching over time.

Figure 10A:
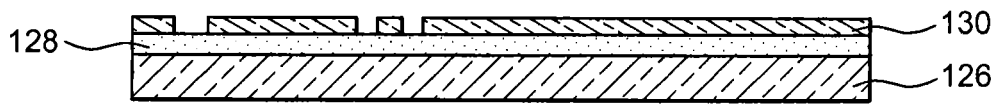
FIGS. 10A to 10H are schematic representations of the steps of a third exemplary method for making the device according to the present invention, enabling a hinge with a reduced thickness with respect to that of the mass to be made.
Figure 10B:
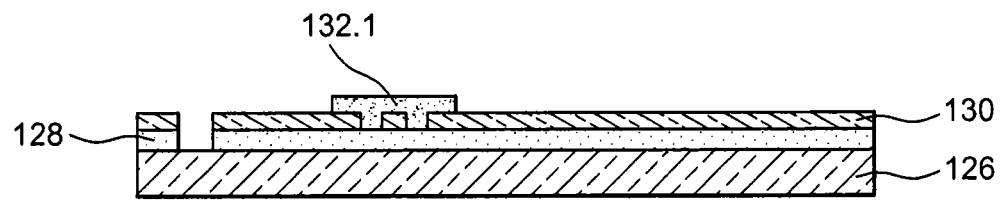
Figure 10C:
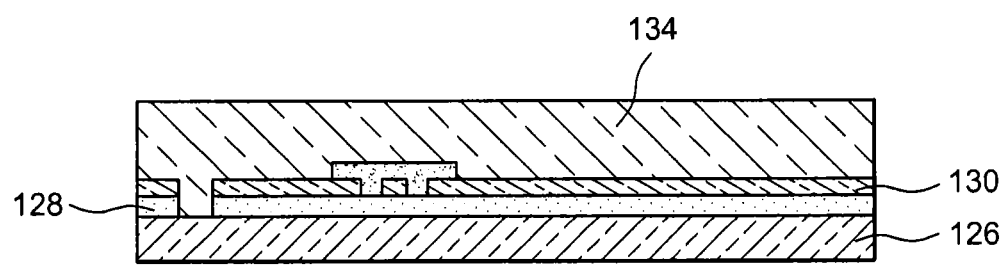
Figure 10D:
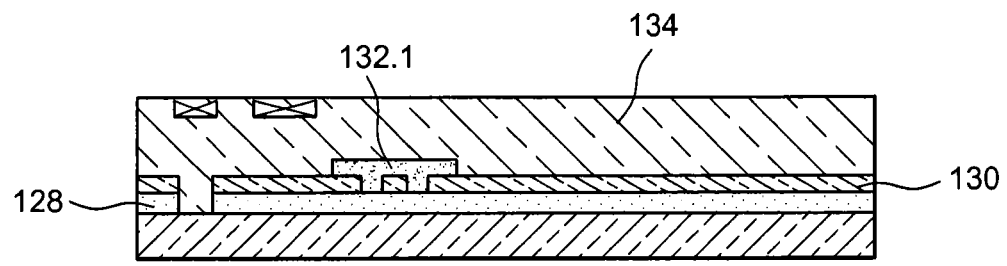
Figure 10E:
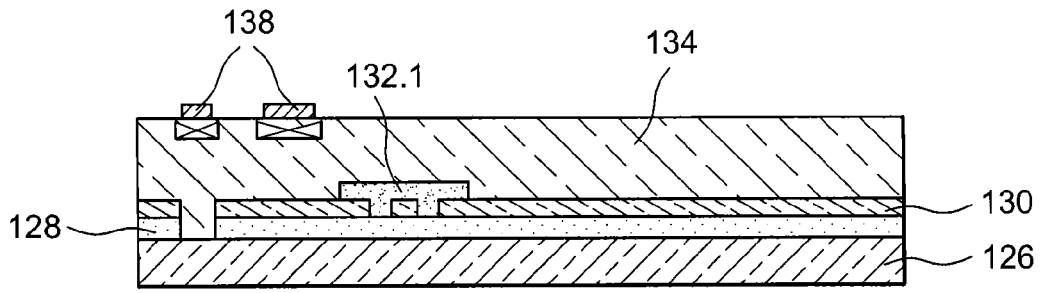
Figure 10F:
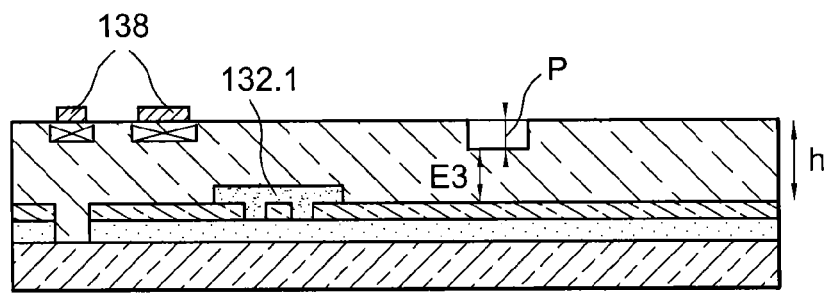
Figure 10G:
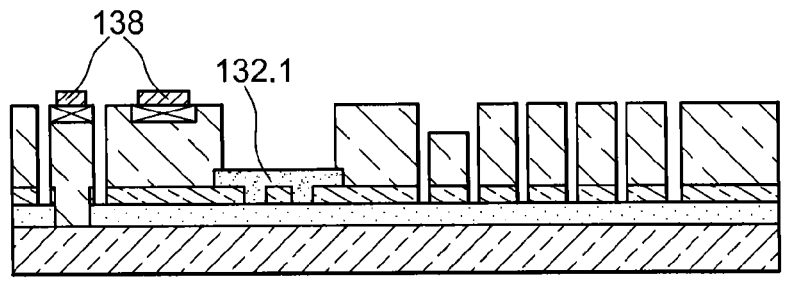
Figure 10H:
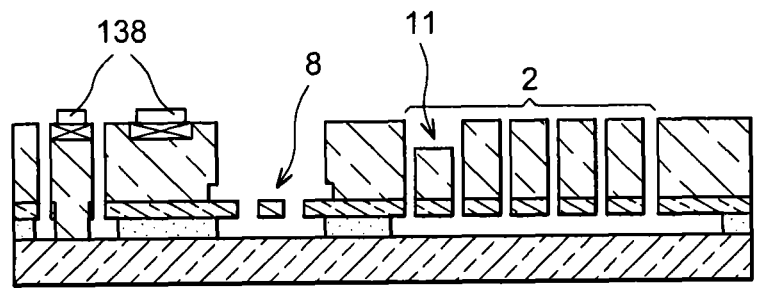

During a following step represented in FIG. 10G, the seismic mass 2 and the hinge 11 are released, by removing the oxide layer 128 and the piezoresistive gauge 8 by removing the portion 132.1, for example by means of liquid sulphuric acid and/or steam. This is an etching over time. The sulphuric acid is left in contact with the oxide layer 128 and the oxide for the time necessary to release the seismic mass while leaving some sacrificial layer under the fixed parts of the system.

Figure 11:
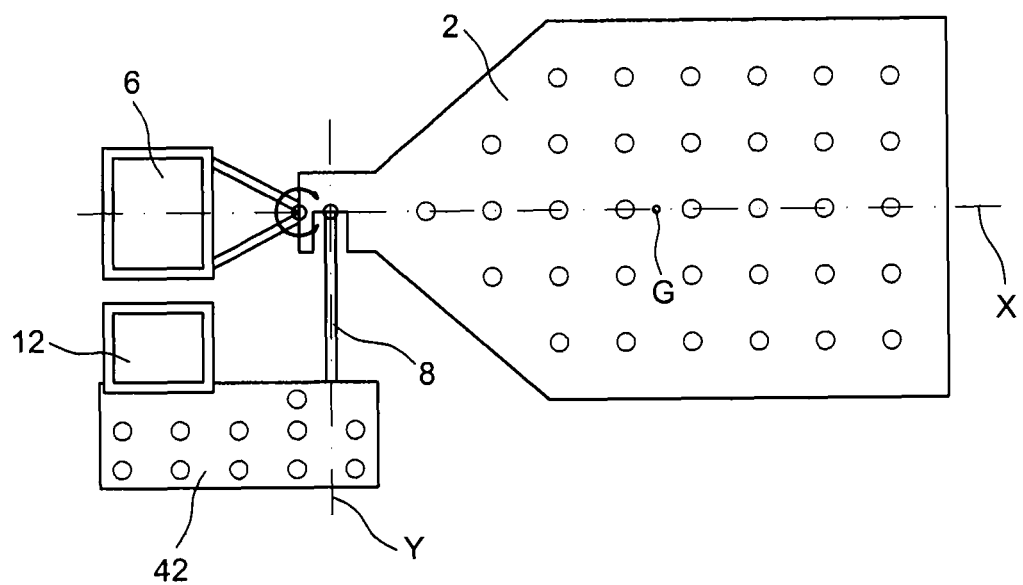
FIG. 11 is a top view of another example for implementing the second embodiment.

In FIG. 11, another particular advantageous exemplary detection device according to the present invention can be seen.

In this example of implementation, the strain gauge 8 is connected to the anchoring pad 12 by a suspended arm 42 in turn anchored onto the anchoring pad 12. The anchoring pad 12 is located close to the anchored pad 6 of the seismic mass 2.

The suspended arm 42 offers a high rigidity in the direction of the acceleration to be measured, i.e. in the direction of the axis Y.

This close arrangement of the anchoring pad 12 of the gauge 8 and the anchoring pad 6 of the seismic mass 2 enables the differential expansions between both anchorings 2, 12 to be restricted and thereby the accelerometer drift to be restricted as a function of the external mechanical stresses and temperature.

The suspended arm 42 is made at the same time as the seismic mass 2. The holes visible in FIG. 11 are for enabling the seismic mass and the suspended arm to be released as for the other examples of implementation.

The invention claimed is:
1. An in-plane MEMS or NEMS detection device for measuring displacements directed along a direction, comprising:
   a seismic mass suspended with respect to a substrate, the seismic mass being pivotable about an axis perpendicular to the plane of the substrate;
   at least one piezoresistive strain gauge suspended between the seismic mass and the substrate, and mechanically and electrically directly connected to the seismic mass and to an embedding pad anchored to the substrate,
   the seismic mass being in turn suspended with respect to the substrate by at least one beam, the at least one beam being connected to the substrate at an area distinct from that by which the gauge is connected to the substrate,
   wherein the piezoresistive gauge is thinner than the seismic mass, and wherein the axis of the piezoresistive strain gauge is orthogonal to the plane containing the pivot axis and the center of gravity of the seismic mass and the plane being orthogonal to the direction of the displacements to be measured, and
   wherein the at least one beam has a thickness higher than a thickness of the piezoresistive gauge.
2. The in-plane MEMS or NEMS detection device according to claim 1, wherein the mechanical connection between the piezoresistive gauge and the seismic mass is located on or next to the plane containing the center of gravity and the pivot axis.
3. The in-plane MEMS or NEMS detection device according to claim 2, wherein the seismic mass includes a recess receiving an end of the gauge for being connected to the seismic mass, the end of the gauge being connected to a bottom of the recess, the bottom of the recess being located in or next to the plane containing the center of gravity and the pivot axis.
4. The in-plane MEMS or NEMS detection device according to claim 1, wherein the seismic mass includes an in-plane tapered area at a connection of the seismic mass with the piezoresistive gauge.
5. The in-plane MEMS or NEMS detection device according to claim 1, wherein a thickness of the seismic mass is in an order of a few tens μm and the thickness of the piezoresistive gauge is in an order of a few μm.
6. The in-plane MEMS or NEMS detection device according to claim 5, wherein the plane containing the pivot axis and the center of gravity form a plane of symmetry for suspension of the seismic mass.
7. The in-plane MEMS or NEMS detection device according to claim 1, further comprising: the at least one beam maintaining the seismic mass suspended and carrying the rotational axis of the mass, the at least one beam having the thickness equal to or higher than that of the piezoresistive gauge and lower than that of the seismic mass.
8. The in-plane MEMS or NEMS detection device according to claim 7, wherein the at least one beam maintaining the seismic mass suspended and carrying the rotational axis of the mass, is substantially provided in the plane containing the center of gravity, which is parallel to the plane of the substrate.
9. The in-plane MEMS or NEMS detection device according to claim 1, further comprising:
   the at least one beam maintaining the seismic mass suspended and carrying the rotational axis of the mass,
   wherein the plane containing the pivot axis and the center of gravity form a plane of symmetry for suspension of the seismic mass, the least one beam having the thickness equal to a thickness of the seismic mass.
10. The in-plane MEMS or NEMS detection device according to claim 1, further comprising: the at least one beam and an additional beam maintaining the seismic mass suspended and carrying the rotational axis of the mass, the beams being of substantially a same length, anchored to the substrate at two distinct points, and anchored to the seismic mass at a point through which the pivot axis passes.
11. The in-plane MEMS or NEMS detection device according to claim 1, further comprising an additional piezoresistive gauge, the piezoresistive gauges mounted as a differential symmetrically with respect to the plane containing the center of gravity and the pivot axis.
12. The in-plane MEMS or NEMS detection device according to claim 11, wherein mounting of both piezoresistive gauges mounted as a differential is associated with a Wheatstone half-bridge mounting.
13. The in-plane MEMS or NEMS detection device according to claim 1, wherein current flows between the embedding pad of the at least one piezoresistive gauge and an embedding pad of the beam, via the piezoresistive gauge and a hinge of the seismic mass with respect to the substrate about the axis.
14. The in-plane MEMS or NEMS detection device according to claim 1, wherein the at least one beam has the thickness higher than that of the piezoresistive gauge and equal to that of the seismic mass.
15. A method for making an in-plane MEMS or NEMS detection device, the method comprising:
   forming a first thin area, having a first thickness forming at least one piezoresistive gauge; and
   forming a second thick area, having a second thickness higher than the first thickness forming at least one seismic mass, the seismic mass being suspended with respect to a substrate and being pivotable about an axis perpendicular to the plane of the substrate, wherein
   the forming of the at least one piezoresistive strain gauge includes suspending the at least one piezoresistive gauge between the seismic mass and the substrate, the at least one piezoresistive strain gauge being mechanically and electrically directly connected to the seismic mass and to an embedding pad anchored to the substrate,
   the forming of the seismic mass includes suspending the seismic mass with respect to the substrate by at least one beam, the at least one beam being connected to the substrate at an area distinct from that by which the gauge is connected to the substrate, and the at least one beam having a thickness higher than that of the piezoresistive gauge, and
   the piezoresistive gauge is thinner than the seismic mass, and the axis of the piezoresistive strain gauge is orthogonal to the plane containing the pivot axis and the center of gravity of the seismic mass and the plane being orthogonal to the direction of the displacements to be measured.
16. The method according to claim 15, wherein the first thin area is made by forming a portion of a second sacrificial layer within a layer of semi-conducting material, and etching the portion and a first sacrificial layer.
17. The method according to claim 15, wherein the forming the portion of the second sacrificial layer within the layer of the semi-conducting material includes
   etching a first layer of semi-conducting material which is located on the first sacrificial layer, depositing and etching the second sacrificial layer to define the portion, and making a second layer of semi-conducting, conducting or insulating material.

18. The method according to claim 17, wherein the making the second layer of semi-conducting material on the portion is achieved by epitaxial growth of a semi-conducting material.

19. The method according to claim 17, wherein the second layer is a polycrystalline semi-conducting material.

20. The method according to claim 15, further comprising forming a third area, as a hinge area, with a thickness between that of the first area and that of the second area.

21. The method according to claim 20, wherein the first area and the third area are obtained by etching operation independent from each other.

22. The method according to claim 21, wherein etching of the third area is performed before etching the first and second areas, or through DRIE.

* * * * *